United States Patent
Kley et al.

(10) Patent No.: US 6,920,507 B1
(45) Date of Patent: *Jul. 19, 2005

(54) SYSTEM AND CORRESPONDING METHOD FOR PROVIDING REDUNDANT STORAGE OF A DATA FILE OVER A COMPUTER NETWORK

(75) Inventors: Victor B. Kley, Berkeley, CA (US); Ian Lovejoy, Petaluma, CA (US)

(73) Assignee: Metadigm LLC, Berkeley, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 10/165,757

(22) Filed: Jun. 7, 2002

Related U.S. Application Data

(62) Division of application No. 09/546,898, filed on Apr. 10, 2000, now Pat. No. 6,430,625, which is a continuation of application No. 09/185,231, filed on Nov. 3, 1998, now Pat. No. 6,161,146, which is a continuation of application No. 08/672,793, filed on Jun. 28, 1996, now Pat. No. 5,862,346.

(51) Int. Cl.[7] ............................................. G06F 15/16
(52) U.S. Cl. ..................... 709/248; 709/201; 709/203; 340/825.2
(58) Field of Search ................................ 709/201, 203, 709/248; 340/825.2

(56) References Cited

U.S. PATENT DOCUMENTS

| | | | | |
|---|---|---|---|---|
| 4,542,380 A | * | 9/1985 | Beckner et al. | 340/825.5 |
| 4,558,413 A | * | 12/1985 | Schmidt et al. | 707/203 |
| 4,887,204 A | * | 12/1989 | Johnson et al. | 707/10 |
| 4,899,136 A | * | 2/1990 | Beard et al. | 345/156 |
| 4,974,173 A | * | 11/1990 | Stefik et al. | 345/751 |
| 5,008,853 A | * | 4/1991 | Bly et al. | 345/751 |
| 5,072,412 A | * | 12/1991 | Henderson et al. | 345/804 |
| 5,220,657 A | * | 6/1993 | Bly et al. | 711/152 |
| 5,442,639 A | * | 8/1995 | Crowder et al. | 714/712 |
| 5,490,270 A | * | 2/1996 | Devarakonda et al. | 707/201 |
| 5,515,491 A | * | 5/1996 | Bates et al. | 345/754 |
| 5,572,643 A | * | 11/1996 | Judson | 709/218 |
| 5,633,999 A | | 5/1997 | Clowes et al. | |
| 5,649,105 A | * | 7/1997 | Aldred et al. | 709/220 |
| 5,671,428 A | * | 9/1997 | Muranaga et al. | 345/751 |
| 5,689,706 A | | 11/1997 | Rao et al. | |
| 5,781,908 A | | 7/1998 | Williams et al. | |
| 5,862,346 A | | 1/1999 | Kley et al. | |
| 6,101,546 A | | 8/2000 | Hunt | |
| 6,161,146 A | | 12/2000 | Kley et al. | |

* cited by examiner

*Primary Examiner*—Saleh Najjar
(74) *Attorney, Agent, or Firm*—Townsend and Townsend and Crew LLP

(57) ABSTRACT

A distributed group activity network system and corresponding method over a computer network. It synchronizes and provides access by system users to shared data files of a group activity. The distributed group activity network system comprises one or more server computers and client computers that are connected to the server computer(s) by network connections. Each of the server computers comprises a network server and a memory system. The network server runs on the server computer and provides basic network services that are available at the server computer. The memory systems of the server computers store synchronization files and shared data files of the group activity. Each of the client computers comprises a memory system and a system module running on the client computer. The system modules of the client computers use the memory systems of the client computers and the available basic network services at the server computer(s) to synchronize and provide access to the shared data files by the system users by also using the memory systems of the client computers and the available basic network services at the server computer(s) to synchronize access to and access the synchronization files.

1 Claim, 7 Drawing Sheets

SYSTEM AND CORRESPONDING METHOD FOR PROVIDING REDUNDANT STORAGE OF A DATA FILE OVER A COMPUTER NETWORK

CROSS-REFERENCES TO RELATED APPLICATIONS

This is a divisional application of U.S. patent application Ser. No. 09/546,898 filed Apr. 10, 2000, now U.S. Pat. No. 6,430,625, which is a continuation of U.S. patent application Ser. No. 09/185,231 filed Nov. 3, 1998, (now U.S. Pat. No. 6,161,146), which is a continuation of U.S. patent application Ser. No. 08/672,793 filed Jun. 28, 1996, (now U.S. Pat. No. 5,862,346), all of which are incorporated by reference herein.

BACKGROUND OF THE INVENTION

The present invention relates generally to group activity (GA) network systems and corresponding methods that control, synchronize, and provide access by system users to the shared data files of a group activity (i.e., project, task, plan, etc.). In particular, it pertains to a distributed group activity network system and corresponding method where individual system modules are run on client computers and utilize the basic network services available at one or more server computers that store the shared data files of the group activity so as to control, synchronize, and provide access to the shared data files and to distribute these shared data files to the client computers for storage.

In many local area networks (LANs) and/or wide area networks (WANs), conventional GA network systems are established over the networks and control, synchronize, and provide access by system users to the data files of a group activity. For example, such GA network systems may comprise accounting systems, planning systems, manufacturing control systems, distribution systems, order control systems, marketing and sales systems, quote estimating systems, publication layout systems, version control systems (VCS), etc. Thus, the term data file for purposes of this patent is considered to comprise generally any data representing text, graphic images, program code, financial information, business plans, etc.

These conventional GA network systems depend on dedicated (i.e., centrally maintained) primary GA processes running on a server computer of the network and secondary limited GA processes running on the client computers of the network. Moreover, these GA network systems require large storage areas dedicated at the server computer for storing all of the shared data files.

In the specific example of a VCS, versions of electronic documents shared by project users are developed and maintained. In this context, and for purposes of this patent, the term electronic document is considered to comprise generally any electronic file containing editable or modifiable content such as program code, text, graphic images, etc. Conventional VCSs use dedicated primary VCS processes running on the network's server computer and secondary limited VCS processes running on the network's client computers. And, these VCSs use large storage areas dedicated at the server computer for maintaining and developing the versions of the electronic documents.

The just described features of conventional GA network systems make them unsuitable for use on large, complex, and diverse networks. This is particularly true in the case of the Internet.

For example, since the primary GA processes of conventional GA network systems are dedicated at a server computer, they are subject to periodic interruptions due to loss of connection or maintenance and make no provision for smoothly dealing with such interruptions. Moreover, since they require dedicated storage areas at the server computer, they do not make effective use of existing storage areas which arc cost effectively available at the client computers of the network.

In addition, conventional GA network systems are maintained by a specialist whose interest is the computer server or other groups in the organization served by the network rather then the system users. In a rapidly growing (changing) computer server, the maintenance of the server computer is unable to keep up with demand. Thus, as commercial availability of network services over the Internet, and other networks proliferates, it will require less capital to rent an HTTP (i.e., Web) or FTP site (i.e., server computer) to use in a group activity then it will to construct or expand a native in-house server.

Furthermore, conventional GA network systems do not operate effectively over long distances or complex networks, such as the Internet, except at the cost of maintaining expensive dedicated communication lines between the server computer and the individual client computers. And, conventional GA network systems include no convenient provisions to enable a user to graphically monitor the progress of the development of the group activity.

BRIEF SUMMARY OF THE INVENTION

In summary, the present invention is a distributed group activity network system and corresponding method over a computer network. It synchronizes and provides access by system users to shared data files of a group activity. The distributed group activity network system comprises one or more server computers and client computers that are connected to the server computer(s) by network connections.

Each of the server computers comprises a network server and a memory system. The network server runs on the server computer and provides basic network services that are available at the server computer. The memory systems of the server computers store synchronization files and shared data files of the group activity.

Each of the client computers comprises a memory system and a system module running on the client computer. The system modules of the client computers use the memory systems of the client computers and the available basic network services at the server computer(s) to synchronize and provide access to the shared data files by the system users by also using the memory systems of the client computers and the available basic network services at the server computer(s) to synchronize access to and access the synchronization files.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1:
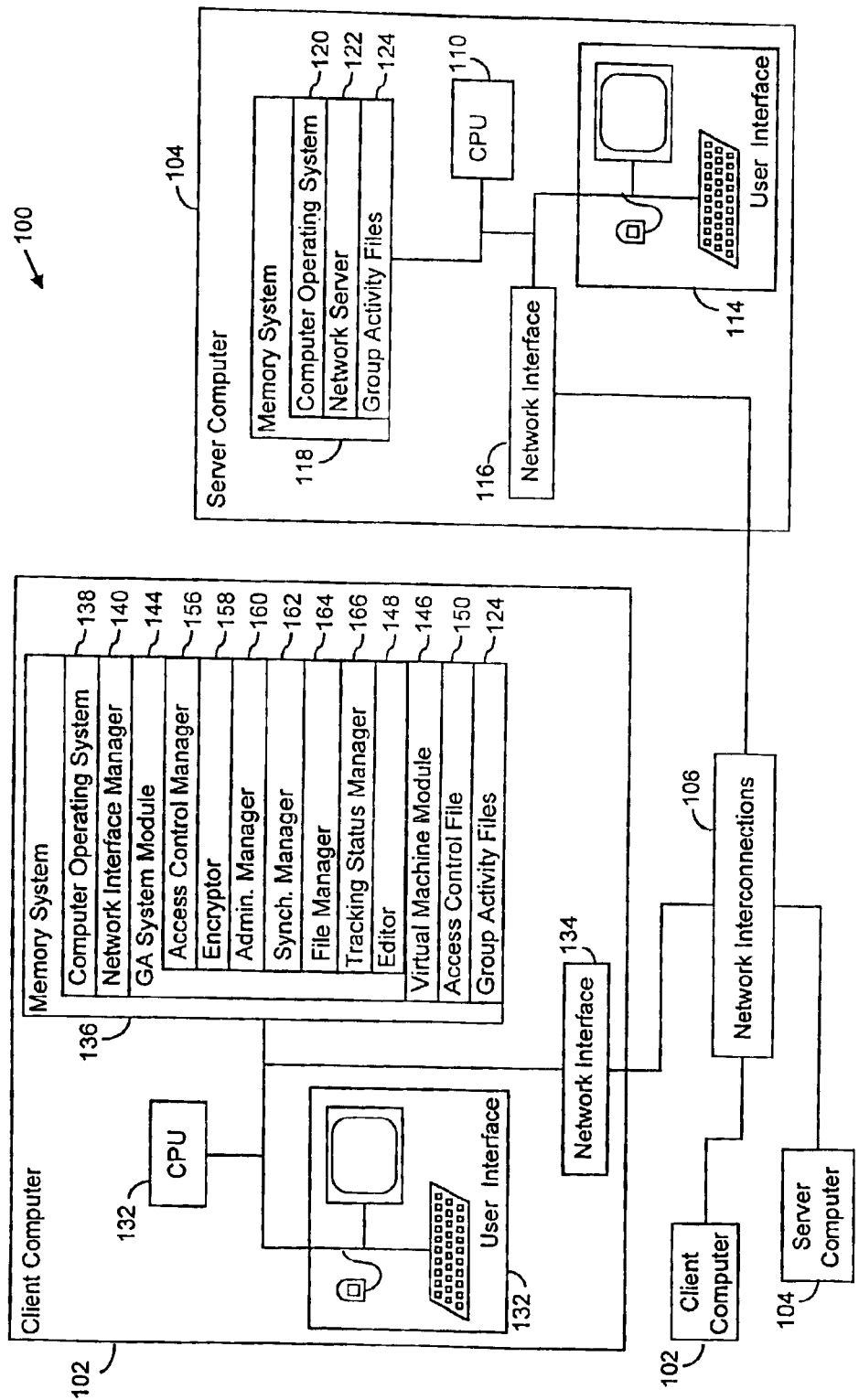
FIG. 1 is a block diagram of a distributed GA network system in accordance with the present invention.

Referring to FIG. 1, there is shown a distributed GA network system 100 over a computer network in accordance with the present invention. The distributed GA network system supports one or more group activities among system users. Each of these group activities may include separate portions of the group activity. For example, the distributed GA network system 100 may comprise a distributed VCS for developing and maintaining versions of one or more electronic documents (i.e., portion of group activity) of one or more document development projects (i.e., group activity).

The distributed GA network system 100 includes one or more client computers 102, one or more server computers 104, and network interconnections 106. The client and server computers are connected together via the network interconnections 106. The network interconnections may comprise a local or wide area network, the Internet, or some other types of network interconnections.

Each server computer 104 is used for one or more group activities in that it is specifically used for one or more separate portions of the group activity(ies). Thus, for example, in the case where the distributed GA network system 100 comprises a distributed VCS, each server computer is used in developing and maintaining the version(s) of one or more electronic documents in a corresponding project. Moreover, each server computer includes a central processing unit (CPU) 110, a user interface 114, a network interface 116, and a memory system 118.

The memory system 118 of each server computer 104 stores an operating system 120 and a network server 122. These items are loaded or installed into the memory system with the user interface. And, for each document development project for which the server computer is being used, the memory system also stores and maintains group files 124 in the manner described later. The operating system and network server are run on the CPU 110. The operating system controls and coordinates running of the network server.

To make use of existing network technology, the network server 122 may be of a conventional type that provides basic (i.e., kernel or standard) network services (or operations) that are available at the server computer 104 in response to commands received from a client computer 102 via the network interconnection 106. For example, the network server may be a file transfer protocol (FTP) server that provides basic conventional FTP services in accordance with the Request For Comments (REC) 959 of the Network Working Group, dated October 1985, which is hereby explicitly incorporated by reference. These FTP services include transferring (i.e., adding and 20 copying) files to and from client computers in response to the FTP STOR and RETR commands and removing (i.e., deleting) files at the sever computer in response to the FTP DELE command. Or, it may be a hypertext transfer protocol (HTTP) server that provides basic HTTP services according to the HTTP version 1.1 proposed by the HTTP Working Group of the Internet Engineering Task Force in an Internet Draft, referred to as "draft-ietf-http-v11-spec-01.html", dated Jan. 19, 1996, and hereby explicitly incorporated by reference. These HTTP services include transferring files in response to the HTTP PUT and GET commands and removing files in response to the HTTP DELETE command. Alternatively, the network server may be a native server 122 in a LAN or WAN that and makes available many more services under a native protocol than FTP or HTTP servers, but which still provides the basic network services of transferring and removing files.

Each client computer 102 is configured to enable a user to communicate with each server computer 104. Each client computer includes a central processing unit (CPU) 130, a user interface 132, a network interface 134, and a memory system 136.

The memory system 136 of each client computer 102 stores an operating system 138, a network interface manager 140, a GA system module 144, a virtual machine module 146, an access control file 150. The user interface 132 is used to load or install these items in the memory system. The memory system also stores any group files 124 that have been downloaded from the server computers 104 and/or generated at the client computer 102 by the GA system module. The operating system, network interface manager, virtual machine module, and GA system module are all run on the CPU 130. The operating system controls and coordinates running of the network interface manager, virtual machine module, and GA system module in response to commands issued by a user with the user interface 128.

As will be clear from the following discussions of the operation of the GA system module 144 at each client computer 102, the GA system module uses the basic network services of the network server 122 that are available at a server computer 104. Thus, unlike conventional GA network systems, the distributed GA network system 100 does not use or require dedicated GA processes running at the server computer to support the group activity. Moreover, in the example where the distributed GA network system comprises a distributed VCS, the GA system module comprises a VCS module used to develop and maintain versions of the electronic document(s) in a document development project at the server computer using the available basic network services of the network server.

The GA system module 144 is preferably written in a platform independent programming language, such as the Java programming language. Thus, the client computer 102 includes a virtual machine module 146, such as a Java virtual machine module, that verifies, interprets, and then executes programs on the CPU 130 that, like the GA system module, are written in the platform independent programming language. This allows the GA system module to be distributed to and executed on a variety of client computers with different platforms.

Communication between the client computers 102 is made by their network interface managers 140. This is done via their network interfaces 134 and the network interconnections 106. Moreover, communication between the client computers and the server computers 104 is made by the client computers' network interfaces and the server computers' network servers 122. This is done via the network interfaces 134 and 116 of the client and server computers and the network interconnections 106. Thus, the references made hereinafter to communication (e.g., transferring and downloading files, transmitting messages and requests, etc.) between the client computers and between the client computers and the server computers refer to communications made in the ways just mentioned.

Figure 2:
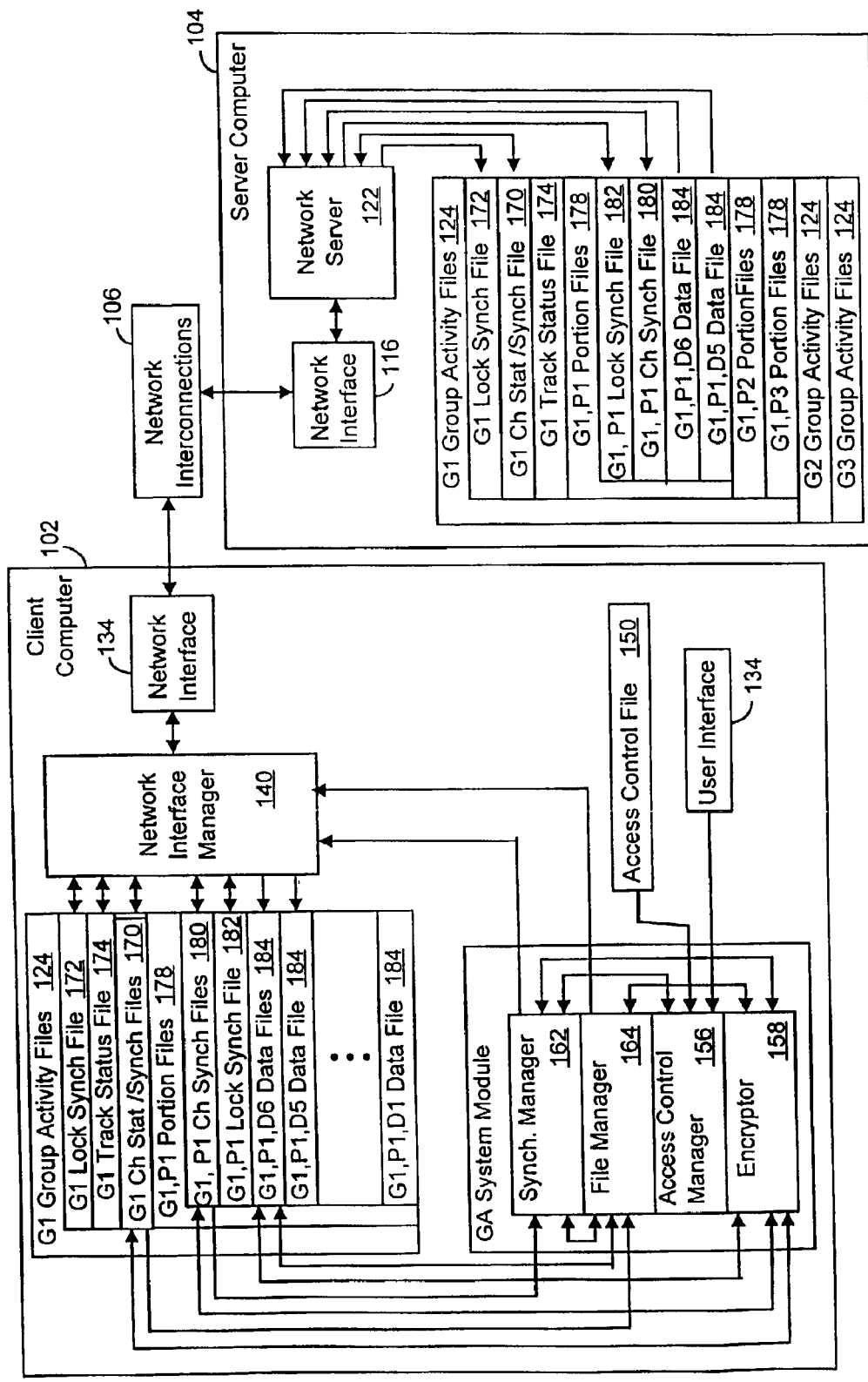
FIG. 2 is a functional block diagram of the operation of the GA system module at a client computer in seeking access to update a data file of a group activity maintained at a server computer.

Referring to FIG. 2, as mentioned earlier, each server computer 104 is used for one or more group activities. Thus, for each group activity, there are corresponding shared group files 124 stored at the server computer. These include a group (or master) checkout and status synchronization file 170, a group (or master) locking synchronization file 172, and a group tracking (i.e., log) status file 174. In addition, for each portion of a group activity, the group files include group portion files 178 that comprise a group portion checkout synchronization file 180, a group portion locking synchronization file 182, and one or more current data files 184 of the portion of the group activity.

In the case where the distributed GA network system 100 is a distributed VCS, the project files 124 of each document development project comprise a project checkout status and synchronization file 170, a project locking synchronization file 172, and a project progress tracking status file 174 for each document development project. Moreover, the document files 178 for each electronic document in the project include a document checkout synchronization file 180, a document locking synchronization file 182, and one or more current version files 184 of the corresponding electronic document. And, as those skilled in the art will recognize, the electronic documents themselves may be versions of other electronic documents. Thus, in this case, their version(s) would be sub-versions of earlier versions of electronic documents. In this way, a hierarchical tree of versions would be maintained and developed. For example, in a strict hierarchical tree of versions, each version would be an electronic document and would have its own document checkout file and document locking synchronization file.

Turning back to FIG. 1, the GA system module 144 includes an administration manager 160. The administration manager enables an authorized administrating user to set up a group activity.

Specifically, the administration manager 160 allows the administrating user to set up a server computer 104 to provide access by system users to the corresponding group files 124 of a group activity at the server computer. In doing so, the administrating user of each group activity uses the administration manager to add the group checkout status and synchronization file 170, the group locking synchronization file, the group progress tracking status file 174, the group portion checkout synchronization file(s) 180, and the group portion locking synchronization file(s) 182 to the memory system 118 of the server computer. This is done with commands issued by the administrating user with the user interface 132 to the administration manager. In response, the administration manager creates these files and then causes the network interface manager to transfer them from the client computer to the server computer along with a request to load these files in the server computer's memory system. In response, the network server 122 of the server computer then loads the transferred files into the server computer's memory system.

The administration manager 160 enables the administrating user to control access by system users to the corresponding group files 124 at a server computer 104. Specifically, the administrating user of each group activity creates with the administration manager a corresponding access control file 150 for each system user in the group activity. This is done with commands issued to the administration manager via the user interface 132.

As will be described shortly, for each system user, the access control file is read by the GA system module 144 at the client computer 102 used by the system user and controls the type of access the system user will have to the group files 124 of the corresponding group activity at the corresponding server computer 104. For example, the types of accesses (i.e., operations) that are available may include any combination of read (or copy) a selected data file, update a selected data file, create a new data file, compare selected data files, track a selected data file, etc. In the example where the distributed GA network system 100 comprises a distributed VCS, the version control accesses include reading a selected version file, creating a new version file from a selected version file, comparing version files, tracking a version file, etc. To control such accesses, the access control file for each system user may include access control information and/or encryption keys for the corresponding project.

In particular, the access control files 150 for the system users in a group activity may each include one or more encryption keys. The encryption key(s) is(are) used to encrypt and decrypt the group files 124 that are downloaded from and uploaded to the server computer 104 that is being used for the corresponding group activity. Thus, one or more group (or master) encryption keys could be used for encrypting and decrypting the group checkout status and synchronization file 170 and the group progress tracking status file 174 of a group activity and then one or more corresponding group portion encryption keys could be used for each separate portion of the group activity for encrypting and decrypting the group portion files 178 associated with that portion. Or, simply one or more encryption keys corresponding to all of the group files of a group activity could be used for universally encrypting and decrypting them all.

Access to the group files 124 at a server computer 104 may be controlled by the absence and presence of encryption keys in the access control files 150 of system users in a group activity. For example, if the access control file for a system user does not include any encryption keys for the group portion files 178 for a particular portion of the group activity, the system user has no access to these group portion files because he will not be able to encrypt or decrypt them. Moreover, if a public encryption key is to be used for decrypting the group portion files and a private encryption key is used for encrypting them, and the access control file of the system user does not include the private encryption key, then the system user will not have access to add (i.e., create) new or update existing data files 184. This is true because the system user will not be able to properly encrypt these data files so that they can then be decrypted by him or other system users with the public encryption key.

Additionally, access may also be controlled by including access control information in the access control files 150 for a system user in a particular group activity. The access control information may identify the types of accesses allowed or not allowed by the system user. This may be used alone or in conjunction with the encryption keys described earlier. For example, an encryption key that is used for both encrypting and decrypting the group portion files 178 of a particular portion of a group activity may be included in the access control file for a system user. Thus, if the access control file includes this encryption key and also access control information indicating that the system user is only allowed to read data files 184 at a server computer 104, then the system user will be prevented from adding new or updating existing data files at the server computer.

The administrating user distributes the access control files 150 to the system users at the other client computers 102 with the administration manager 160. This is done with commands issued to the administration manager via the user interface 132. In response, the administration manager causes the network interface manager 140 to transfer the access control files to the client computers of the system users. Each system user at a client computer then loads the received control access file into the memory system 136 of the client computer. This is done with commands issued with the user interface 132 to the network interface manager 140.

The GA system module 144 itself may be distributed to the system users at the other client computers 102 by the administrating user. This is also done with the administration manager 160 at the administrating user's client computer 102 and in response to commands issued to the administration manager via the user interface 132. In response, the administration manager causes the network interface manager 140 to transfer the GA system module stored in the memory system 136 of the administrating user's client computer to the client computers of the other system users. Each system user at a client computer then installs the GA system module into the memory system of the client computer. This is done with commands issued with the user interface 132 to the network interface manager 140.

In another embodiment, the GA system module 144 is stored in the memory system 118 of each server computer 104. In this embodiment, each client computer 102 includes a dedicated local GA system process. When a system user at a client computer wishes to perform a group activity operation, this local GA system process is invoked by the system user with commands issued with the user interface 134. In response, the local GA system process then causes the network interface manager 140 to transmit a request to the network server 122 at the server computer to download the GA system module to the client computer 102. In response, the network server downloads the GA system module to the client computer and the client computer's network interface manager loads it into the client computer's memory system 136.

In still another embodiment, the GA system modules 144 may be distributed manually with a set of portable memories, such as compact optical discs, floppy discs, etc. to the system users. Each GA system module is then loaded by the corresponding system user into the memory system 136 of the system user's client computer 102 using commands issued with the user interface 134.

After the GA system module 144 has been installed at each system user's client computer 102, the GA system modules collectively control, synchronize, and provide access to the data files 184 at the sever computer 104 for a corresponding group activity. And, as alluded to earlier, this is done using the basic network services available with the network server 122 and without any dedicated GA system processes running on the server computer.

However, accesses to the data files 184 at the server computer 104 of a corresponding group activity need to be synchronized among the system users. For accesses that do not require writing back a data file to the server computer 104, such as read a data file or compare data files, this requires the GA system modules to only access the group checkout and locking synchronization files 170 and 172 to synchronize access to the data files. On the other hand, to synchronize accesses to the data files that require writing back a data file to the server computer 104, such as adding a new data file or updating an existing data file, this requires the GA system modules to access both the group checkout and locking synchronization files and the group portion checkout and locking synchronization files 180 and 182.

Specifically, FIG. 2 illustrates the operation of the GA network system 100 when a current system user seeks access to update an existing data file 184 at a server computer 104 of a portion of a group activity. In doing so, the current system user first requests the GA system module 144 at the system user's client computer 102 to perform this particular access by issuing commands with the user interface 132.

The access control manager 156 of the GA system module 144 receives the request and then reads the current system user's corresponding access control file 150 for the group activity. The access control manager then determines from the encryption key(s) and/or access control information in the access control file whether the current system user is authorized to perform the requested access. If the current system user is not, then the access is terminated by the access control manager. But, if the current system user is authorized, then the access control manager invokes the synchronization manager 162 of the GA system module to proceed with the operation.

Since the requested access is to update a selected data file 184 of a portion of a group activity, the synchronization manager 162 then causes the network interface manager 140 to transmit a request to the network server 122 of the server computer 104 to delete the corresponding group portion locking synchronization file 182. If the group portion locking synchronization file is located in the memory system 118 of the server computer (i.e., it has not already been deleted by another system user), then the network server deletes it. As a result, the network server transmits back to the synchronization manager a message indicating that the delete was successful. If the group portion locking synchronization file is not located in the memory system of the server computer (i.e., it has already been deleted by another system user), then the network server transmits back to the synchronization manager a message indicating that the delete was not successful. As a result, the processes just described must be repeated until the group portion locking synchronization file is deleted.

When the deletion of the group portion locking synchronization file is successful, this means that the current system user's GA system module 144 owns the group portion locking synchronization file 182. As a result, the current system user's GA system module can check out the corresponding portion of the group activity (and the selected data file) and update the corresponding group portion checkout synchronization file 180 to indicate this 20 while the GA system modules of other system users cannot. Each group portion checkout synchronization file identifies which, if any, system user has currently checked out (i.e., owns access to) the corresponding portion of a group activity and its data file(s) 184.

In order to update the group portion checkout synchronization file 180, the synchronization manager 162 causes the network interface manager 140 to transmit a request to the network server 122 at the server computer to download the group portion checkout synchronization file to the client computer 102. In response, the network server downloads the group portion checkout synchronization file to the client computer and the client computer's network interface manager loads it into the client computer's memory system 136 (not shown in FIG. 2).

The synchronization manager 162 then causes the encryptor 158 to decrypt the group portion checkout synchronization file 180 with the 5 corresponding encryption key in the access control file 150. After this has been done, the synchronization manager 162 reads the group portion checkout synchronization file to determine if the corresponding portion of the group activity has already been checked out by another system user. If it has, then the requested access is terminated. However, if the group portion checkout synchronization file indicates that the portion of the group activity has not been checked out, then the synchronization manager updates it to indicate that the current system user has checked out the corresponding portion of the group activity.

Once the group portion checkout synchronization file 180 has been updated, the synchronization manager 162 then causes the encryptor 158 to encrypt it with the corresponding encryption key in the access control file 150. Then, the synchronization manager causes the network interface manager 140 to transmit the updated group portion checkout synchronization file to the network server 122 along with a request for the network server 122 to store it. The network server then stores it in place of the previous group portion checkout synchronization file. When this occurs or when the requested access has been terminated, the synchronization manager causes the group portion locking synchronization file 182 to be re-added in the same manner as is discussed later for the group locking synchronization file. 172.

Once this has been done, the synchronization manager 162 causes the network interface manager 140 to transmit a request to the network server 122 of the server computer 104 to delete the group locking synchronization file 172 for the corresponding group activity. If the group locking synchronization file 172 is in the memory system 118 of the server computer (i.e., it has not already been deleted by another system user), then the network server deletes it. As a result, the network server transmits back to the synchronization manager a message indicating that the delete was successful. If the group locking synchronization file 172 is not in the memory system 118 of the server computer (i.e., it has already been deleted by another system user), then the network server transmits back to the synchronization manager a message indicating that the delete was not successful. As a result, the processes just described must be repeated until the group locking synchronization file is deleted.

When the deletion of the group locking synchronization file 172 is successful, this means that the current system user's GA system module 144 owns the group locking synchronization file. As a result, the current system user's GA system module can update the group checkout synchronization file if no other system users have checked it out while the GA system modules of other system users cannot.

The group checkout synchronization file 170 for each group activity is maintained and updated in the manner to be described shortly. It identifies (1) the system users in the group, (2) the version file(s) 184 of each portion of the group, (3) when and by which system user each portion of the group was checked out and in, (4) the version file(s) of the portion(s) that have been distributed to (i.e., stored at the client computer of) each system user, and (5) when and by which system user the group checkout synchronization file has been currently checked out.

Once the group locking synchronization file 172 has been successfully deleted, the synchronization manager invokes the file manager 164 of the GA system module 144. The file manager 162 causes the network interface manager 140 to transmit a request to the network server 122 at the server computer to download the group checkout status and synchronization file 170 to the client computer 102. In response, the network server downloads the group checkout status and synchronization file to the client computer and the client computer's network interface manager loads it into the client computer's memory system 136 (not shown in FIG. 2).

The file manager 164 then causes the encryptor 158 to decrypt the project checkout synchronization file 170 with the corresponding encryption key in the access control file 150. After this has been done, the file manager 164 reads the project checkout synchronization file to determine which data file(s) 184 of the entire group activity at the server computer 104 have not yet been distributed to the current system user. Then, the file manager causes the network interface manager 140 to transmit a request to the network server 122 of the server computer 104 to download to the client computer 102 these data files, including the selected data file of the requested access, and all of the synchronization and status files 170, 172, 174, 180, and 182 of the group activity. In response, the network server downloads them to the client computer and the client computer's network interface manager loads them into the client computer's memory, system 136 (not shown in FIG. 2).

Once the data files 184 have been distributed to the current system user's client computer 102, then the file manager updates the group checkout status and synchronization file 170 to indicate that these data files 184 have been distributed to the current system user. It then reads the group checkout 20 status and synchronization file to determine which data files at the server computer have now been distributed to each system user. Those that have, are then deleted at the server computer 104 in the same manner in which the group portion and group checkout status and synchronization files 180 and 170 are deleted.

By distributing the data files 184 and the synchronization and status files 170, 172, 174, 180, and 182 to the system users' client computers 102 with each requested access to the data files at the server computer 104, the state of the distributed GA network system 100 is archived at the client computers at the time of the access. Thus, the distributed GA network system takes advantage of the existing storage capacities of the client computers to archive the state of the distributed GA network system. This ensures that more then just the server computer (and more than just one client computer) stores the state of the entire group activity so that storage of it is redundant (i.e., backed up) and adequately protected. Thus, in case of a failure at the server computer, the administrating user can re-create the entire group activity at the server computer by having the needed data files and synchronization and status files transferred from one of the client computers to the server computer. Moreover, as network systems become more common and extensive and archival features become readily available it is anticipated that the GA system module 144 at any client computer may use more than just one server computer for archival storage of the data files.

In addition, as alluded to earlier, only the most current data files 184 that have not yet been distributed to all of the system users are stored at the server computer 104. This is particularly useful for a server computer 104 whose memory system 118 has limited storage capacity or where the server computer is a commercial server site and it is desirable to limit the available storage space for cost reasons.

After the group checkout status and synchronization file 170 has been updated to identify which data files 184 have been distributed to the current system user, the file manager causes the encryptor 158 to encrypt the group checkout status and synchronization file with the corresponding encryption key in the access control file 150 and causes the network interface manager 140 to transmit the updated group checkout status and synchronization file to the network server 122 along with a request for the network server 122 to store it. The network server then stores it in place of the previous group checkout status and synchronization file.

After this has been done, the file manager 164 invokes the synchronization manager 162. In response, the synchronization manager generates a group locking synchronization file 172 and causes the encryptor 158 to encrypt it with the appropriate encryption key. It then causes the network interface manager 140 to transmit the group locking synchronization file to the network server 122 of the server computer 104 and a request to store it. In response, the network server then stores it so as to re-add (i.e., re-create) it at the sever computer. Thus, during the time while the group locking synchronization file was deleted, no other system users are able to update the group checkout status and synchronization file. This mechanism synchronizes access among the system users' GA system modules 144 to the group checkout status and synchronization file so that only one of them can update it at a time and prevents the group checkout status and synchronization file from being mistakenly overwritten.

Moreover, after the selected data file 184 for the requested access has been downloaded, the file manager 164 then makes a copy of it and causes the encryptor 158 to decrypt the copy with the corresponding encryption key in the access control file 150. The selected data file is then available to be updated.

Figure 3:
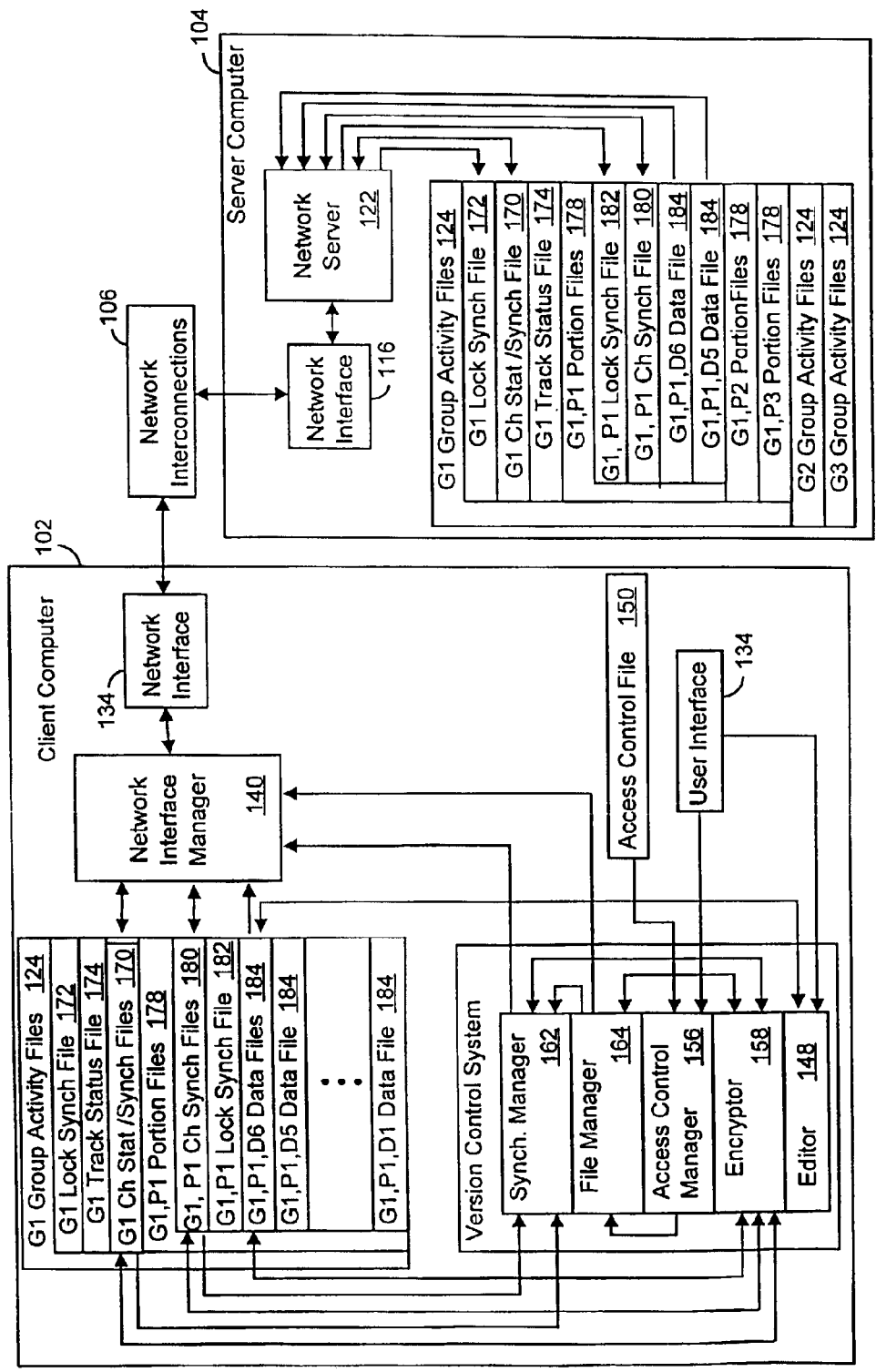
FIG. 3 is a functional block diagram of the operation of the GA system module of FIG. 2 in updating the data file.

Referring now to FIG. 3, the GA system module 144 also includes an editor 148. The user uses the editor in conjunction with the user interface to edit the selected data file 184 that was copied and decrypted so as to update it. This editor may be any type of program or application running on the client computer 102 that is capable of editing or modifying program code, text, graphic images, spreadsheets, etc. For example, the editor may be a word processor, program code compiler, paint or drawing program, spreadsheet program, charting program, project management program, presentation program, accounting program, business plan program, financial planning program, etc.

Once the selected data file 184 has been updated, then the current system user invokes the access control manager 156 using the user interface 134 and requests that the corresponding portion of the group activity and the, selected data file be checked in. The access control manager again determines whether the current system user is authorized to do so in the same manner as that described previously.

Once it is determined that the current system user is authorized, the file manager 164 causes the encryptor 158 to encrypt the selected data file with the appropriate encryption key. It then causes the network interface manager 140 to transmit the updated data file to the network server 122 of the server computer 104 and a request to store it. In response, the network server then stores it in the memory system 136 of the sever computer.

Then, the file manager 164 invokes the synchronization manager 164. In response, the synchronization manager first deletes the group portion locking synchronization file 182, and updates the group portion checkout synchronization file 180 to indicate that the corresponding group portion has been checked in along with the updated data file, and then re-added the group portion locking synchronization file 182. This is done in a similar manner to that described earlier for checking out the portion of the group activity.

Thus, while the group portion checkout synchronization file 180 indicates that the portion of the group activity is checked out, other system users are not able to add or update data files 184 nor able to update the group portion checkout synchronization file. This mechanism synchronizes access among the system users to the data files and the group portion checkout synchronization file so that only one system user at a time can add or update data files and only one system user at a time can update the group portion checkout synchronization file. This accurately maintains the order of the data files at the server computer 104 and prevents them and the group portion checkout synchronization file from being mistakenly overwritten.

Then, the synchronization manager 162 deletes the group locking synchronization file 172 and updates the group checkout status and synchronization file 170 to indicate that the portion of the group activity and the updated data file 184 have been checked in. This is done in a similar manner to that described earlier for updating the group checkout status and synchronization file to identify the data files that were distributed to the current system user.

The process just described for updating a data file 184 of a portion of a group activity at a server computer 104 is very similar to adding a data file to a portion of a group activity. For example, a data file 184 of a portion of a group activity may be selected for access and updated in the same way as described earlier but then checked in as a new data file instead of as the same data file. This is particularly useful in the case where the distributed GA network system 100 comprises a distributed VCS. The selected version file 184 would be updated and then checked in as a new version file. In this way, the original version files from which new version files are created will still be stored at the server computer 104 until it they are distributed to all of the system users in the manner discussed earlier.

Also, the process for reading a selected data file 184 of a portion of a group activity is similar. However, as mentioned earlier, access to the group portion checkout and locking synchronization files 180 and 182 to synchronize access to the selected data file (i.e., checkout and checkin the portion of the group activity) is not necessary in this case because an updated or new data file is not being written back to the server computer 104. But, access to the group checkout status and synchronization file 170 and the group locking synchronization file 172 is required to synchronize access for updating the group checkout status and synchronization file in the way described earlier to identify the data files that were distributed to the current system user's client computer 102. Thus, after the selected data file is selected for access and then distributed to the system user's client computer along with the data files that haven't yet been distributed to the system user's client computer, it is copied and decrypted in the manner described earlier for updating a selected data file. Then, the editor 148 displays the selected data file on the user interface 134 for the current system user so that it can be read.

The process for comparing selected data files 184 of a portion of a group activity is similar to that for reading a selected data file. For the same reasons described in regard to reading a selected data file, access to the group portion checkout and locking synchronization files 180 and 182 is not necessary but access to the group checkout status and synchronization file 170 and the group locking synchronization file 172 is required. And, after the selected data files are selected for access and then distributed to the system user's client computer along with the data files that haven't yet been distributed to the system user's client computer, they are copied and decrypted in the manner described earlier. Then, the editor 148 compares the selected files and displays the result on the user interface 134 for the current system user. This is particularly useful in the case where the distributed GA network system 100 comprises a distributed VCS and the selected version files 184 would be compared in this manner.

However, for the various kinds of accesses just described, a system user may seek an access to a data file 184 that has been distributed to the client computers 102 in the way described earlier and is no longer stored at the server computer 104. In this case, the operation of the GA system module 144 in controlling, synchronizing, and providing access to it will be the same as that described earlier, except that it will be accessed from the memory system 136 of the client computer so that the process of downloading it from the server computer will be omitted.

Figure 4:
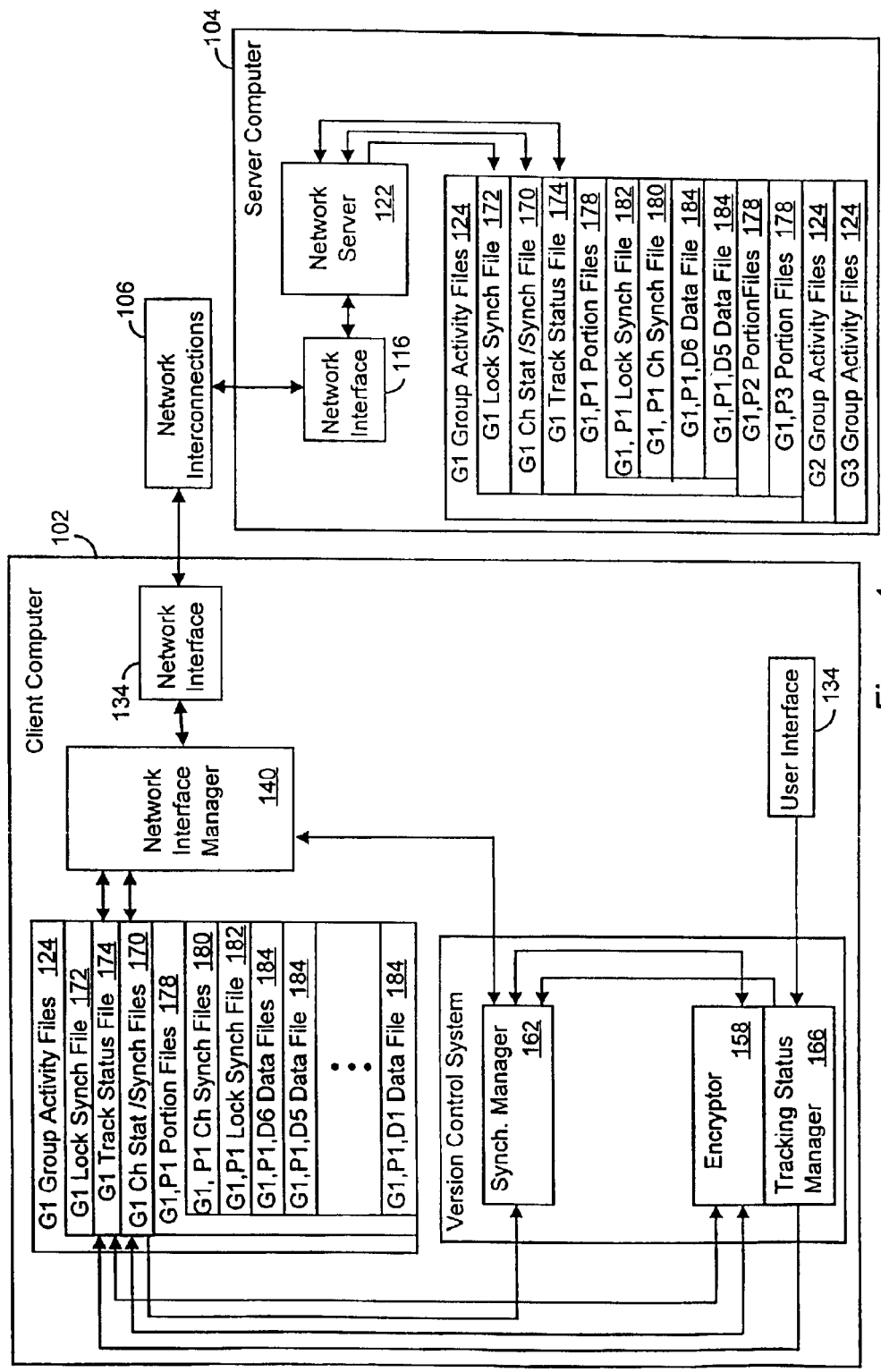
FIG. 4 is a functional block diagram of the operation of the GA system module at a client computer in updating the tracking status file of a group activity.

Now referring to FIG. 4, in conjunction with any of the types of accesses to the data files 184 just described, the current system user may also request with the user interface 134 that the progress tracking status of the selected data file 184 be updated. When this occurs, the progress tracking manager 158 is invoked. It causes the synchronization manager 162 to delete the group locking synchronization file in the manner described earlier. Then, it downloads the group progress tracking status file 174 to the current system user's client computer 102 and causes it to be decrypted by the encryptor 158. This is done in the same manner as was described earlier for downloading other files to the client computer from the server computer. Then, the current system user updates the progress tracking status file with progress tracking (i.e., log) status information associated with the selected data file 184 being accessed, the corresponding portion of the group activity, and/or the group activity itself. This may include test reports, progress reports, program code bug lists, performance results, etc. Once the progress tracking status file has been updated, it is then placed back at the server computer 104 and the group locking synchronization file 172 is re-added at the server computer in the same manner as was described earlier for the updated group checkout synchronization file 172.

In this way, the progress tracking status information of the data files 184 of the portions of a group activity, the portions, and/or the group activity are continuously logged. This is particularly useful in the case where the distributed GA network system 100 comprises a distributed VCS so that the changes in performance, completion, progress, etc. of the version files 184 of electronic documents of a document development project, the electronic documents, and/or the project is logged.

Figure 5:
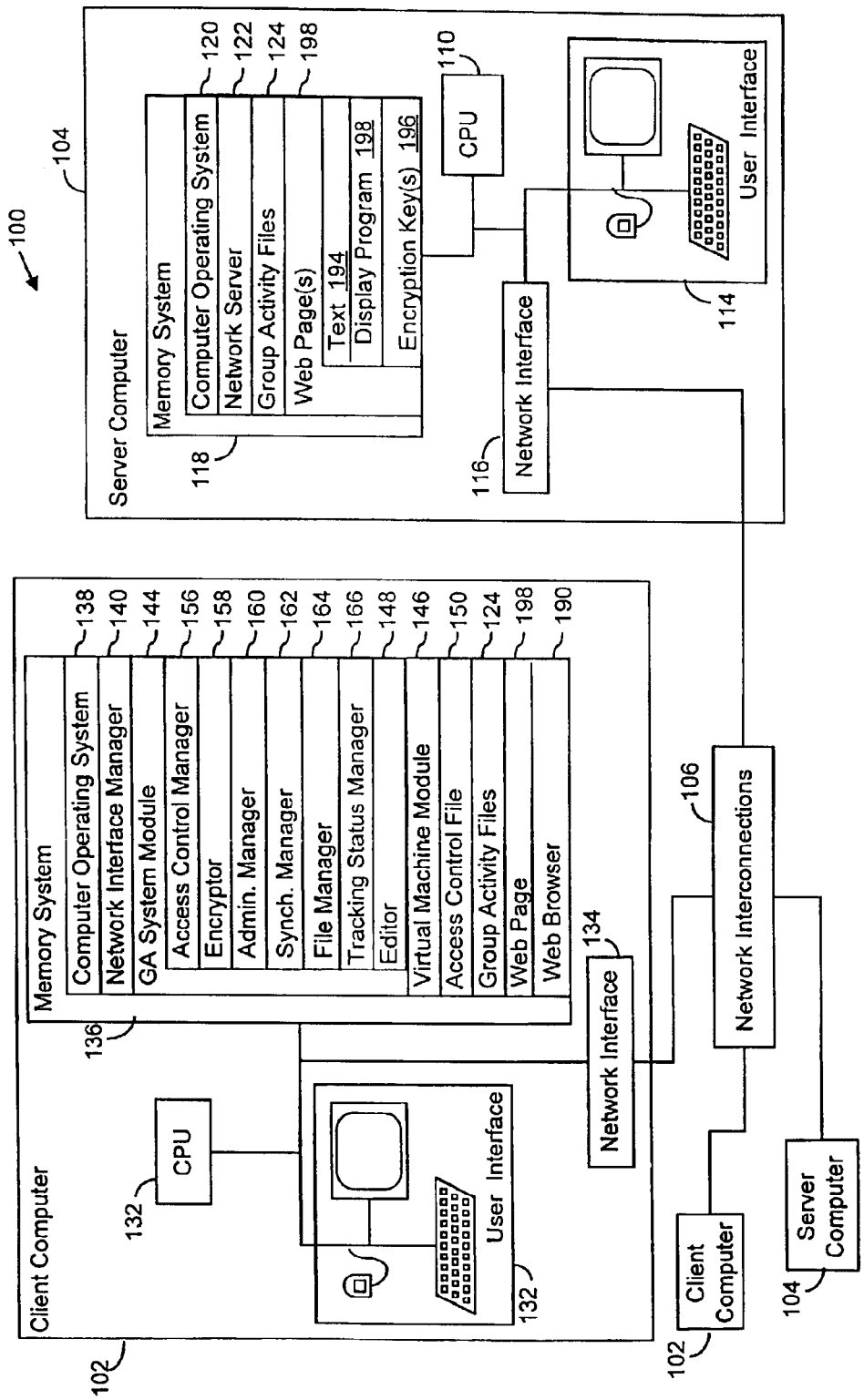
FIGS. 5–7 show different embodiments for displaying at a client computer the progress of a group activity on a Web page.
Figure 6:
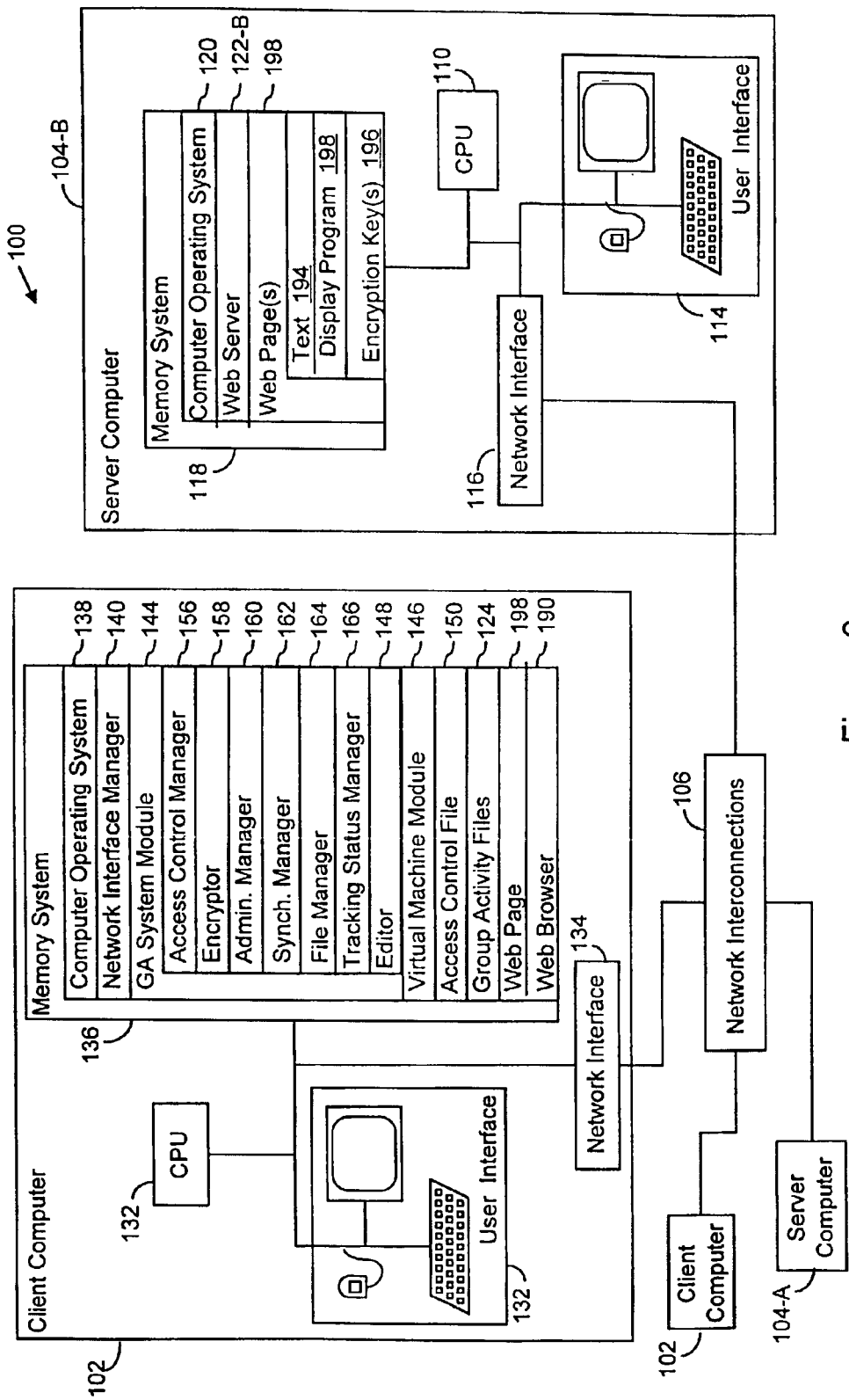
Figure 7:
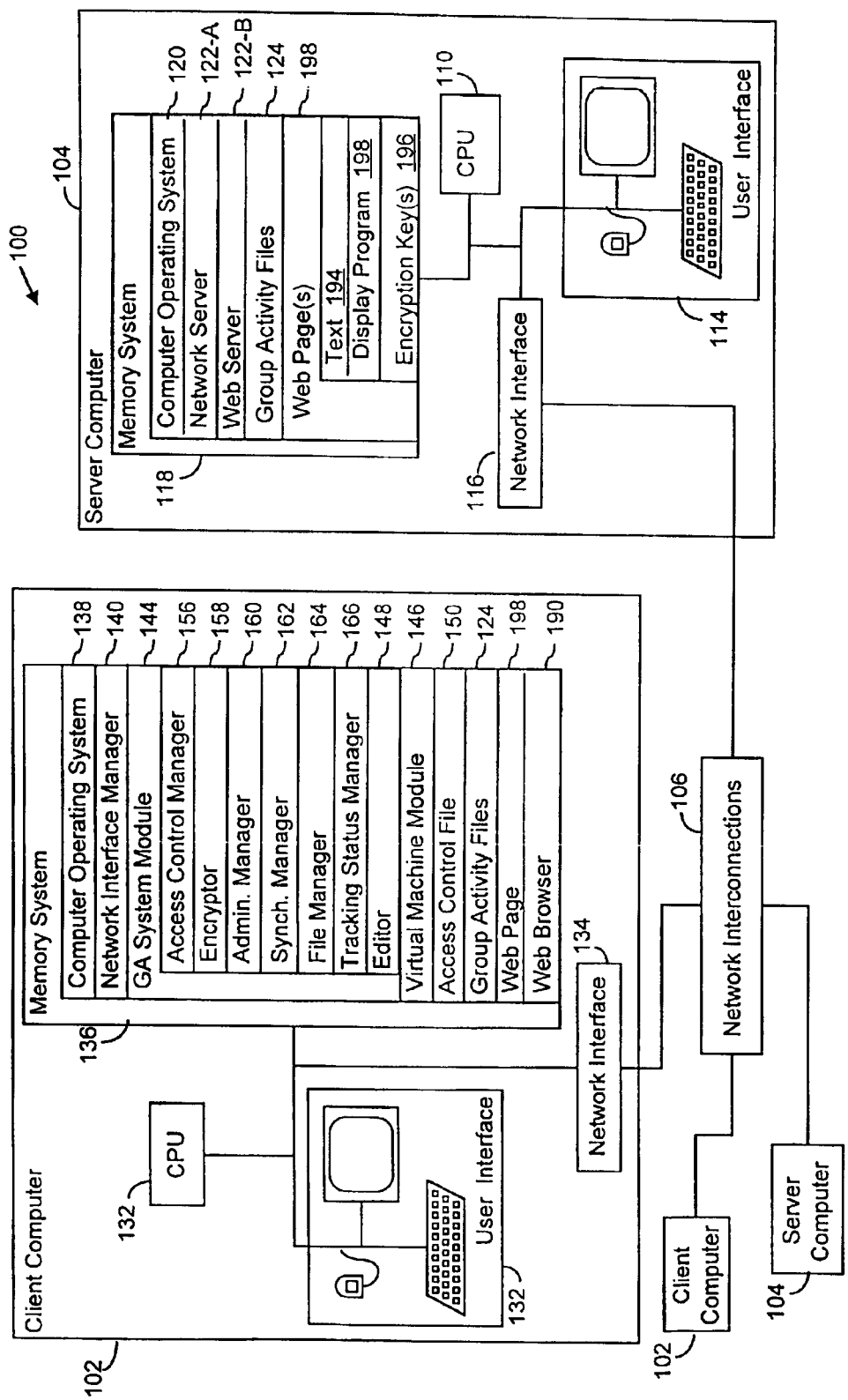

Referring to FIGS. 5–7, there are shown additional embodiments of the present invention. In these embodiments, one or more of the client computers 102 includes a Web browser 192 stored in the memory system 136 of the client computer and which runs on the CPU 130 of the client computer. The information contained in the group checkout and progress tracking status files 170 and 174 of a group activity is used to provide a Web page (i.e., HTML document) 192 displayed by the Web browser 190. The Web page is downloaded by the Web browser to the client computer's memory system in response to commands issued by a system user with the user interface 134 to the Web browser.

The displayed Web page 192 shows status information regarding the data files 184 of the portions of the group activity, the portions, and/or the group activity. This may include information as to when and by whom the data files have been checked in and out and information on the performance, completion, progress, etc. of the data files, the portions of the group activity, and/or the group activity itself.

Referring specifically to FIG. 5, in this embodiment, the network server 122 at the server computer 104 comprises an HTTP server. It therefore can also be used to provide the Web page 192 for each group activity at the server computer 104. Each Web page includes a display program 198 preferably written in a platform independent programming language, such as Java, and verifiable, interpretable, and executable by the virtual machine module 146.

The program is executed by the Web browser 190 with the virtual machine module 146 and causes the project checkout and progress tracking status files 172 and 174 to be downloaded by the HTTP server to the client computer 102 in the manner described earlier without synchronization. Then, this program decrypts the project checkout and progress tracking status files with the appropriate encryption key(s) 196 in the Web page and generates an image from the status information contained in these files which is displayed, along with any text 194 in the Web page, by the Web browser 190.

Now turning to FIG. 6, in this embodiment, the network server 122-A at each of the server computers 104-A comprises either an FTP server or a native server and operates in the way described earlier. And, one of the server computers 104-B is dedicated for displaying the Web page 192. It has a Web (i.e., HTTP) server 122-B for providing the Web page to the Web browser 190. Then, the Web browser displays the Web page in the same manner as was just described for the embodiment of FIG. 5.

In the embodiment of FIG. 7, each of the server computers includes a network (i.e., FTP or native) server 122-A and a Web (i.e., HTTP) server 122-B. Thus, the network server could be used to control, synchronize, and provide the accesses to the data files 184 described earlier while the Web server would be used to display the Web page 192. Moreover, in this embodiment, a two tiered approach could be used to control, synchronize, and provide the accesses described earlier. This might involve using the Web server for accesses that don't require writing back a data file, such as reading a data file or comparing data files. And, the network server could be used for accesses to update a data file or add a new data, which do require writing back a data file.

Moreover, in another embodiment, rather than deleting the document and project checkout synchronization files 172 and 182 to establish ownership to them and then re-creating them when ownership is released, the opposite could be done. In the case where the network server 122 is an FTP server, either method works well because deletion is a guaranteed operation under the FTP. However, under the proposed HTTP version 1.1 described earlier, deletion is not guaranteed. Thus, creation of the document and project checkout synchronization files 172 and 182 to establish ownership to them and then deleting them when ownership is released, is a much safer process.

Additionally, rather than distributing the data files 184 to the system users' client computers with each requested access, they may instead be retained at the server computer 104. In this case, the file manager 164 of the GA system module 144 at each client computer may then delete certain of these data files based on predefined criteria, such as the least recently used, in order to stay within the specified storage limits at the server computer.

Also, as those skilled in the art will recognize, a group activity may be distributed among one or more of the server computers 104. Thus, each of these server computers may store the data files 184 of one or more portions of the group activity and also the corresponding group portion checkout and locking synchronization files 180 and 182 as well. And, the group checkout status and synchronization file 170, group locking synchronization file 172, and group tracking status file 174 would remain at one of the server computers.

Moreover, it is anticipated that as network technologies advance, that the basic network services available with a conventional network server 122 may expand. Thus, such network servers may provide other standard services, such as document compare, sorting etc., in addition to the types described earlier. Therefore, these kinds of network services may be exploited by the GA system modules 144 of the distributed GA network system 100 to provide additional access functions that were originally only available at the client computer, such as comparing data files.

From the foregoing, it is evident that the distributed GA network system 100 is designed to work well even on low-bandwidth potentially unreliable network connections or where maintenance on the server computer is performed often. This is in contrast to present GA network systems that require high-bandwidth reliable network connections and continuous connections in order to work reasonably well.

This effect is achieved by implementing each access (described earlier) as a finite state machine instead of a purely procedural implementation with specific protocols. Thus, if the network connection is interrupted by a network connection failure or maintenance, the access can be suspended until the connection again becomes available. The access then continues from the point of the interruption, so that no time is wasted repeating the steps of the access that were already completed. This scheme makes the maximum possible use of available bandwidth even in the presence of network connection failures or high frequency maintenance. Also, since the actual nature of the network connection is hidden from the access layer, if one means of connection (e.g. a direct network connection or feed) becomes unavailable, another means of connection (e.g. a modem connection) can be used to complete any access already in progress.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for providing redundant storage of data files over a computer network, the system comprising:

server computers, each server computer being configured to (a) make basic network services of a standard network protocol available thereat, and (b) store the data files and synchronization files;

a client computer comprising a memory system that is not directly connected to the server computers over the computer network, the client computer being configured to store the data files at each of the server computers by (a) establishing a network connection between the client computer and the server computer over the computer network and (b) using only the basic network services available at the server computer, the client computer being further configured to retrieve the data files from any of the server computers by (a) establishing a network connection between the client computer and the server computer over the computer network (b) using only the basic network services available at that server computer, wherein redundant storage and retrieval of the data files occurs among the server computers, and the client computer further comprising a file manager, wherein for each access of the data files, the file manager uses the basic network services available at the server computer(s) to distribute to the client computer and store in the client computer's memory system those of the data files that have not yet been distributed to the client computer and the synchronization files so as to archivally store the state of the system at the time of the access of the data file.

* * * * *